US006854347B2

(12) United States Patent
Dantes

(10) Patent No.: US 6,854,347 B2
(45) Date of Patent: Feb. 15, 2005

(54) MEASUREMENT OF COMPONENTS THAT HAVE BEEN MICRO-GALVANICALLY PRODUCED, USING A SAMPLE COMPONENT BY MEANS OF PHOTORESIST WEBS

(75) Inventor: Guenter Dantes, Eberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 245 days.

(21) Appl. No.: 10/297,981

(22) PCT Filed: Apr. 9, 2002

(86) PCT No.: PCT/DE02/01289

§ 371 (c)(1), (2), (4) Date: Dec. 11, 2002

(87) PCT Pub. No.: WO02/084212

PCT Pub. Date: Oct. 24, 2002

(65) Prior Publication Data

US 2004/0026373 A1 Feb. 12, 2004

(30) Foreign Application Priority Data

Apr. 12, 2001 (DE) ........................................ 101 18 274

(51) Int. Cl.[7] ............................................... G01M 19/00

(52) U.S. Cl. ...................................................... 73/865.8

(58) Field of Search ........................................ 73/865.8

(56) References Cited

FOREIGN PATENT DOCUMENTS

| | | | | |
|---|---|---|---|---|
| DE | 196 07 288 | | 10/1996 | |
| SU | 1161821 A | * | 6/1985 | ........... G01B/11/16 |

* cited by examiner

*Primary Examiner*—Hezron Williams
*Assistant Examiner*—Tamiko Bellamy
(74) *Attorney, Agent, or Firm*—Kenyon & Kenyon

(57) ABSTRACT

A method for measuring microgalvanically produced components having a three-dimensional, depth-lithographically produced structure, which provides a single- or multilayer component which is constructed using galvanic metal deposition, the metal being deposited around a structure of photoresist defining the desired orifice contour of the component; in the process, a photoresist region, which selectively interrupts the structure of the component to be manufactured, being incorporated during the microgalvanic production; at least the interrupting photoresist region being dissolved out of the interrupted component; and a contactless measuring of the orifice structure of the interrupted component being undertaken in the region of a previously existing resist edge of the photoresist region using a measuring device.

8 Claims, 4 Drawing Sheets

MEASUREMENT OF COMPONENTS THAT HAVE BEEN MICRO-GALVANICALLY PRODUCED, USING A SAMPLE COMPONENT BY MEANS OF PHOTORESIST WEBS

FIELD OF THE INVENTION

The present invention provides a method for measuring microgalvanically produced components.

BACKGROUND INFORMATION

German Published Patent Application No. 196 07 288 discusses microgalvanically produced components, which are used in the form of orifice disks for injectors, i.e., generally to produce fine sprays, e.g., having large spray angles. The individual layers or functional planes of the orifice disk are constructed one upon the other using galvanic metal deposition (multilayer electroplating). The layers are galvanically deposited in succession, so that each succeeding layer is permanently bonded by galvanic adhesion to the underlying layer, and all layers, together, then form a single-piece orifice disk. To provide better handling of a multiplicity of orifice disks when applying the various manufacturing process steps, two positioning location holes, in the form of circular through holes, are provided on one wafer, per orifice disk, for example, near the outer boundary edge of the orifice disk and extend over the entire axial height of the orifice disk. This facilitates the process of successively building up a plurality of galvanic layers over time. It is only possible to inspect or remeasure the inner orifice structure of such a microgalvanically produced component by using destructive manufacturing processes (grinding).

SUMMARY

The present invention provides a method for measuring microgalvanically produced components wherein, in a simple manner, actual, precise dimensions of the inner structure of the component may be checked and measured, so that information pertaining to the configuration and contour definition of the component is quickly and reliably accessible. For this, in the context of microgalvanically producing the components, in only few selected components, which are otherwise placed, for example, in very large piece numbers on a wafer or panel, photoresist regions or lines are inserted interrupting the structure of these selected components in desirable fashion. Once the photoresist is dissolved, the inner structures of the particular component are easily exposed and are thus able to be measured quite simply in a contact-free and non-destructive manner.

Angles, cavities, rear spaces and offsets of the component's orifice structure, as well as its layer thicknesses may be measurable in contactless fashion.

On a single wafer, galvanic metal deposition may be used to produce identical single- or multilayer components, which are manufactured as complete components without the photoresist regions interrupting the desired orifice structure, together with the components having the interrupting photoresist regions. If it is intended for the components to be remeasured merely by taking random samples, then a ratio of 3 to 5:1000 of interrupted components to complete components of the same type configuration, may be established on one wafer. This permits an assessment of the dimensional accuracy and quality of the manufactured components on the entire wafer.

An exemplary embodiment of the present invention is represented in simplified form in the drawing and is explained in detail in the following description.

DETAILED DESCRIPTION

Figure 1:
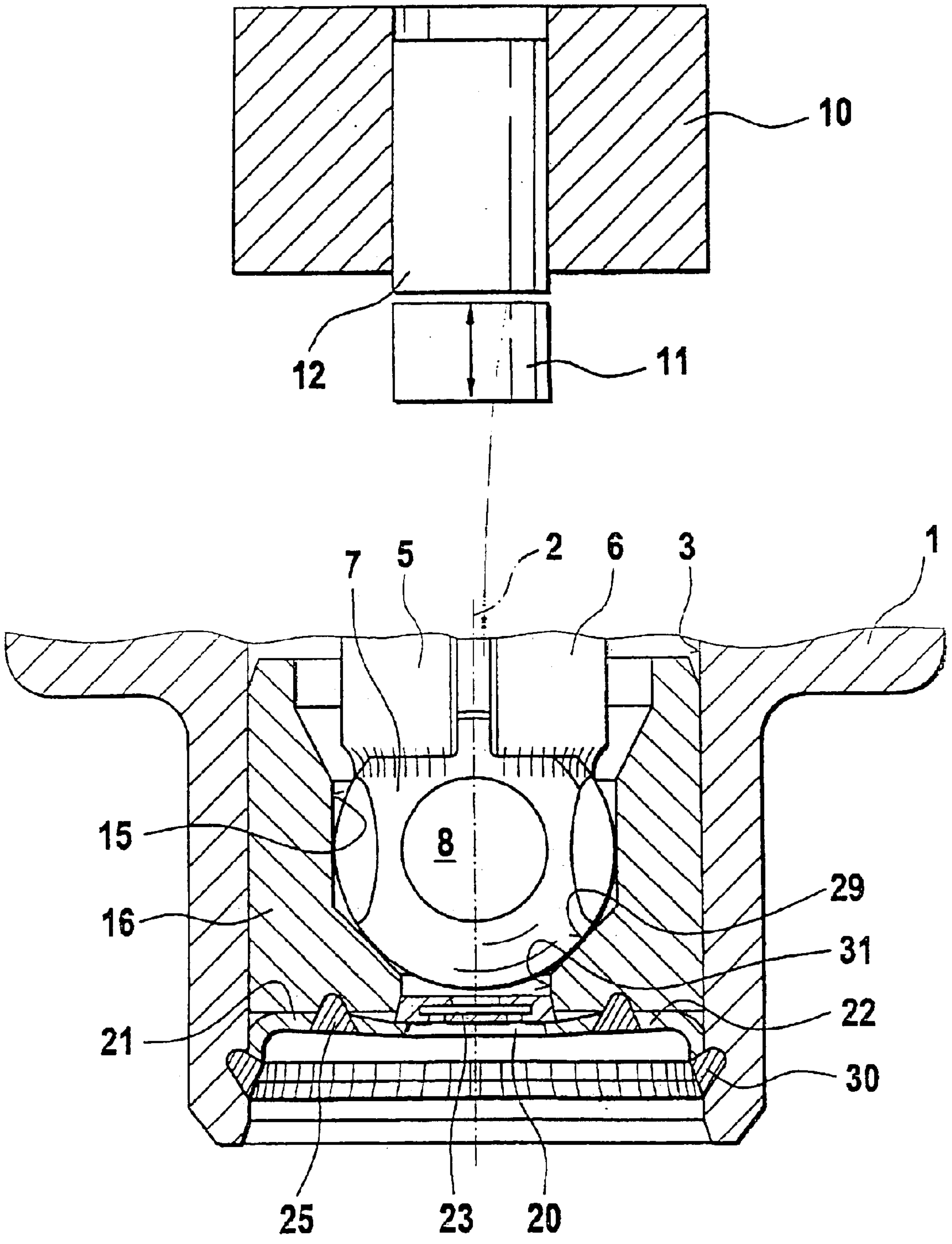
FIG. 1 is a partial representation of an injector having a microgalvanically produced component in the form of an orifice disk.

FIG. 1 is a partial representation of a valve in the form of an injector for fuel injection systems of mixture-compressing, spark-ignition engines. The valve includes an orifice disk 23 which represents an exemplary embodiment of a microgalvanically produced component that is measurable in accordance with the present invention. It should be noted that orifice disk 23, which is described in greater detail below, is not exclusively provided for use on injectors; similar components may also be used, in fact, for paint nozzles, inhalers, ink-jet printers, or for freeze-drying processes, to eject or inject liquids, such as beverages, or to atomize medications. Orifice disks 23 manufactured using multilayer electroplating are quite generally suited for producing fine sprays, for example having large angles.

Orifice disks 23 themselves, in turn, also constitute only one specific embodiment of a microgalvanically produced component. Microgalvanically produced components having forms, contours, size ratios and intended applications that differ completely from the described orifice disk 23 may also be manufactured and measured in accordance with the present invention.

The injector, partially illustrated in FIG. 1, has a tubular valve-seat support 1, in which a longitudinal opening 3 is formed concentrically to a longitudinal valve axis 2. Arranged in longitudinal opening 3 is a, for example, tubular valve needle 5, which is securely connected at a downstream end 6 to a, for example, spherical valve closure member 7, on whose periphery, for example, five flattened regions 8 are provided to allow the fuel to flow past.

The injector may be actuated, e.g., electromagnetically. A schematically indicated electromagnetic circuit having solenoid coil 10, an armature 11, and a core 12 is used for axially moving valve needle 5 and, as such, for opening the injector against the spring force of a restoring spring and, respectively, for closing the injector. Armature 11 is connected, for example, by a welded seam produced by a laser to the end of valve needle 5 facing away from valve-closure member 7, and is aligned with core 12.

A guide opening 15 of a valve-seat member 16, which is imperviously mounted by welding in the downstream end of valve-seat support 1 in longitudinal opening 3, is used to guide valve-closure member 7 during axial movement. Valve-seat member 16 is concentrically and fixedly connected to a, for example, cup-shaped orifice-disk carrier 21, which rests at least with an outer annular region 22 directly against valveseat member 16.

A microgalvanically produced component, here orifice disk 23, is placed upstream from a through hole 20 in orifice-disk carrier 21 such that the disk 23 completely covers through hole 20. A peripheral and impervious first welded seam 25, formed by a laser, joins valve-seat member 16 and orifice-disk carrier 21. Orifice-disk member 21 is joined, for example, by a peripheral and impervious, second welded seam 30 to the wall of longitudinal opening 3 in valve-seat carrier 1.

Figure 2:
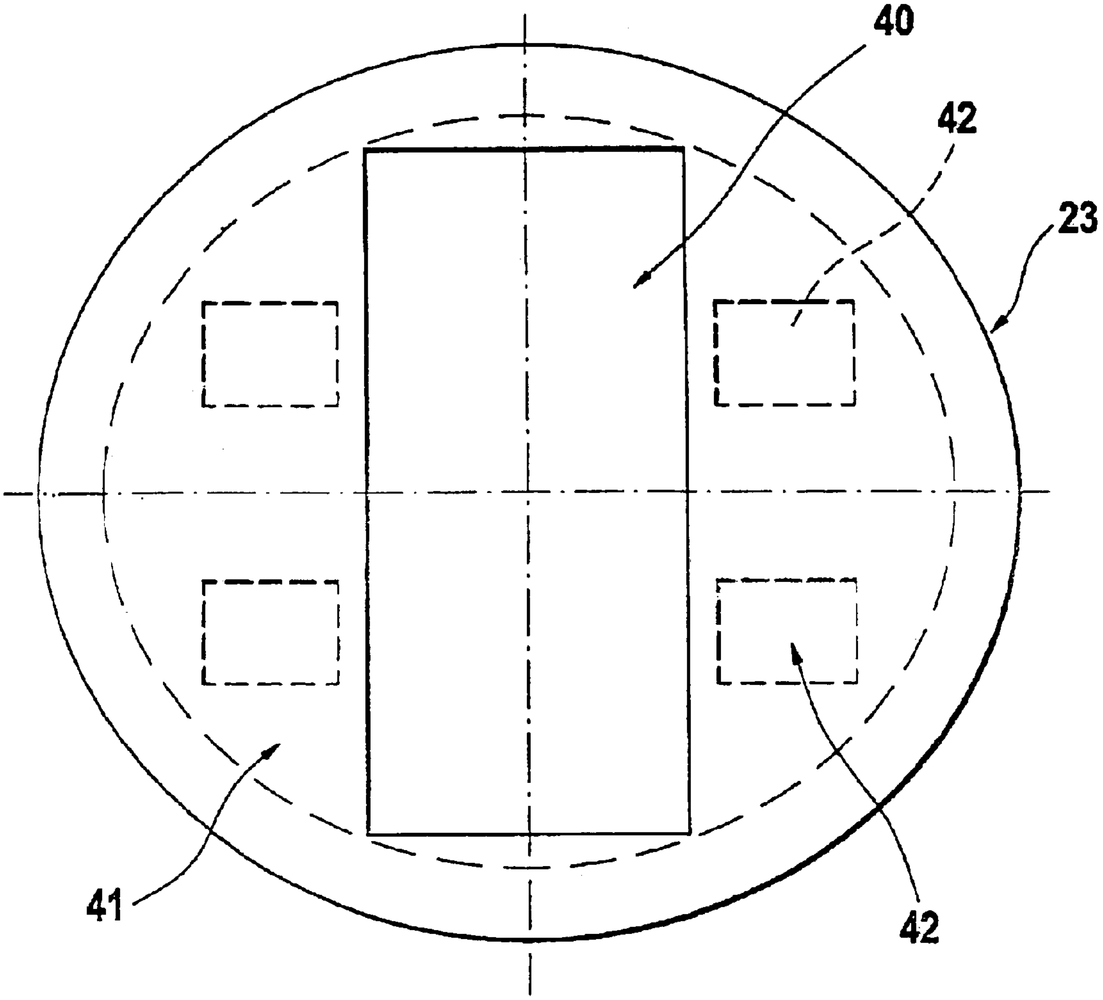
FIG. 2 is a plan view of a microgalvanically manufacturable orifice disk.
Figure 3:
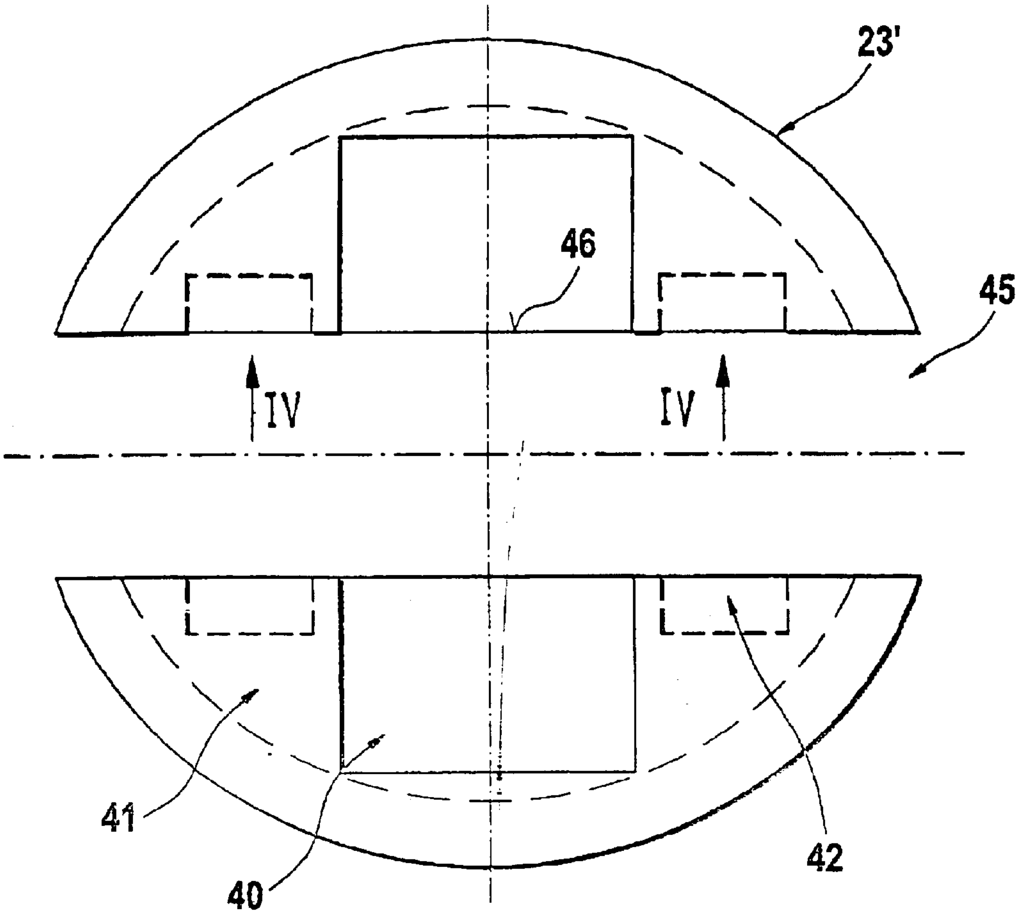
FIG. 3 is a plan view of the orifice disk of FIG. 2, manufactured to include an inner photoresist region, so that the actual orifice disk is interrupted.
Figure 4:
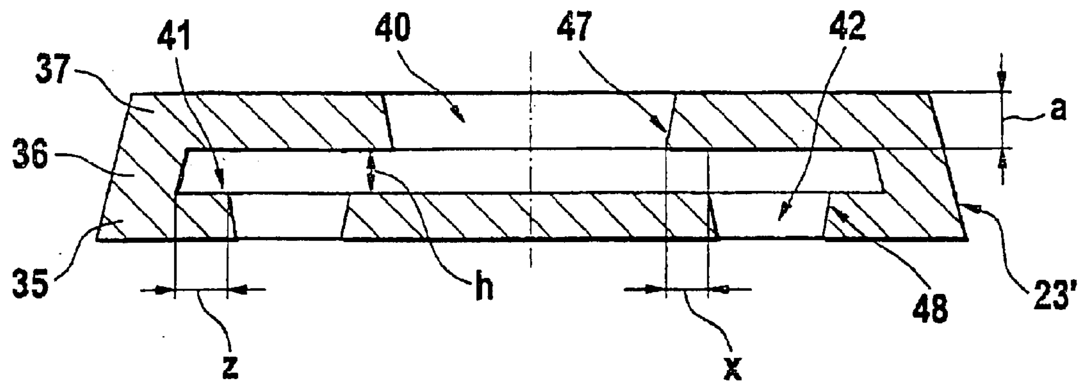
FIG. 4 is a sectional view of the interrupted orifice disk in the region of a resist edge in accordance with arrows IV in FIG. 3.

Orifice disk 23 is clamped in dimensionally accurate fashion, for example, into a cylindrical outlet orifice 31 of valve-seat member 16 following a frustoconically tapered valve-seat surface 29. Orifice disks 23 illustrated in FIGS. 2 through 4 are constructed in a plurality of metallic functional planes using galvanic deposition (multilayer electroplating). The depth-lithographic production using electroplating technology produces special features in the contour definition, such as:

- functional planes having a constant thickness over the disk surface;
- as a result of the depth-lithographic pattern delineation, substantially vertical cuts in the functional planes which form each of the hollow spaces traversed by flow (deviations of about 3° from optimally vertical walls may be caused by production engineering);
- desired undercuts and overlappings of the cuts due to the multilayer structure of individually patterned metal layers;
- cuts of any desired cross-sectional shapes having largely axially parallel walls;
- one-piece configuration of the orifice disk, since the individual metal depositions are performed in immediate succession.

In a plan view, FIG. 2 illustrates an exemplary embodiment of an orifice disk 23 as may be manufactured, for example, on a wafer or panel, side-by-side in the hundreds. Orifice disk 23 is configured as a flat, circular component which has a plurality of, for example three functional planes or layers in axial succession. On this are built up, starting from a lower functional plane 35, for example, two further functional planes 36 and 37, a plurality of functional planes being able to be produced in a single galvanic step using the so-called lateral overgrowth technique.

Top functional plane 37 has a rectangular inlet orifice 40 of a greatest possible size. Four quadratic outlet orifices 42 are provided in lower functional plane 35, each, for example, at the same distance to longitudinal valve axis 2 and, thus, to the center axis of orifice disk 23, and also symmetrically disposed thereto, for example. In the context of a projection of all functional planes 35, 36, 37, outlet orifices 42 lie in one plane, with an offset outside of inlet orifice 40. The offset may vary in size in different directions.

To ensure a fluid flow from inlet orifice 40 to outlet orifices 42, a channel 41, which constitutes a cavity, is formed in middle functional plane 36. Channel 41 having a circular contour is of such a size, which, viewed in the projection, completely covers inlet orifice 40 and outlet orifices 42.

In FIGS. 3 and 4, the orifice disk is illustrated with the same contour definition as orifice disk 23 illustrated in FIG. 2, however, in accordance with the present invention, the orifice disk 23 has an easily measured shape configured as an interrupted orifice disk 23'.

In the following sections, the actual method for manufacturing orifice disks 23 in accordance with FIGS. 2 through 4 is explained below. The method steps used in galvanic metal deposition to manufacture an orifice disk may be inferred, for example, from German Published Patent Application No. DE 196 07 288.

The method starts with providing a flat and stable carrier plate that may be made of metal (titanium, copper), silicon, glass, or ceramic, for example. At least one auxiliary layer is optionally first electrodeposited on the carrier plate. This is, for example, a galvanic starting layer (e.g. Cu) that is needed for electrical conduction for the later microelectroplating.

The galvanic starting layer may also be used as a sacrificial layer, in order to later allow a simple separation of the orifice-disk structures by etching. The auxiliary layer (typically CrCu or CrCuCr) is applied by sputtering or by currentless metal deposition. Following this pretreatment of the carrier plate, a photoresist is applied over the entire surface of the auxiliary layer.

In this context, the thickness of the photoresist may correspond to the thickness of the metal layer to be produced in the later electroplating process, i.e., to the thickness of the lower layer or functional plane 35 of orifice disk 23. The metal pattern to be produced is to be inversely transferred to the photoresist with the aid of a photolithographic mask. One possibility is to expose the photoresist directly via the mask using UV exposure (UV depth lithography).

The negative pattern ultimately produced in the photoresist for the later functional plane of orifice disk 23 is galvanically filled with metal (e.g. Ni, NiCo) (metal deposition). As a result of the electroplating, the metal is applied closely to the contour of the negative pattern, so that the predefined contours are reproduced. To produce the structure of orifice disk 23, it is necessary to repeat the steps starting with the optional application of the auxiliary layer, depending on the number of layers desired, two functional planes being produced, for example, in one galvanic step (lateral overgrowth). For the layers of one orifice disk 23, different metals may also be used, yet are only applicable in each case in a new electroplating step. Orifice disks 23 are subsequently separated. For this, the sacrificial layer is etched away, thereby causing orifice disks 23 to lift off from the carrier plate. The galvanic starting layers are then removed by etching, and the remaining photoresist is dissolved out of the metal structures.

Microgalvanically constructed components, such as orifice disks 23, may be produced in large numbers (e.g., up to >1000 units) on a wafer or panel. After orifice disks 23 are separated from the carrier plate, they are available for their particular intended application. However, the inner orifice structure of such a microgalvanically produced component is then no longer accessible. For testing and measuring purposes, however, a very simple and inexpensive method may be provided for measuring the components, at least by random sampling. In other methods heretofore, orifice disks 23, such as the one illustrated in FIG. 2, were only able to be checked and remeasured by using destructive manufacturing processes. This required expensive embedding and grinding of the components selected for remeasuring. Grinding the finished components may disadvantageously produce burrs which may falsify the measuring result. Moreover, there is an increased risk of deformation of the components to be measured during embedding and grinding.

For that reason, in accordance with the present invention, immediately upon microgalvanically producing the components, for example orifice disks 23, photoresist regions 45, which may also be characterized as resist lines or resist cores, are inserted into only few selected components 23' on the wafer (for example, for 3 to 5 of 1000 components). The incorporation of selective photoresist regions 45 is undertaken via specially formed masks at selected components 23', at the beginning, so that the metal structure to be built up, beginning from lower functional plane 35, is already growing along this photoresist region 45. Thus, selected components 23' are produced in interrupted fashion over an entire structure (FIG. 3). Once photoresist region 45 is dissolved out, the inner structures of the particular component 23' are exposed.

As illustrated in FIG. 3, it is practical to lay photoresist region 45 such that it intersects the orifice structures intended for measurement following manufacturing. Thus, in the case of orifice disk 23' illustrated in FIG. 3, photoresist region 45 is incorporated such that it intersects, at the same time, functional planes 35, 36, 37 in the region of inlet orifice 40, of channel 41, and of outlet orifices 42.

FIG. 4 illustrates a sectional view of interrupted orifice disk 23' in the region of a resist edge 46 in accordance with arrows IV in FIG. 3. Thus, this view does not illustrate a section in the sense of a machine-cutting through orifice disk 23', but rather a side view of the orifice disk part produced in this manner at the beginning. Thus, the easily exposed orifice contour is able to be measured in non-destructive fashion. Typical measurable dimensions of an orifice disk 23 are, for example, layer thickness a, height h of channel 41, offset x of inlet orifice 40 and outlet orifices 42, the so-called rear space z, thus the flow region of channel 41 projecting over outlet orifices 42, as well as inlet edge angle 47 of inlet orifice 40 and outlet edge angle 48 of outlet orifices 42.

Figure 5:
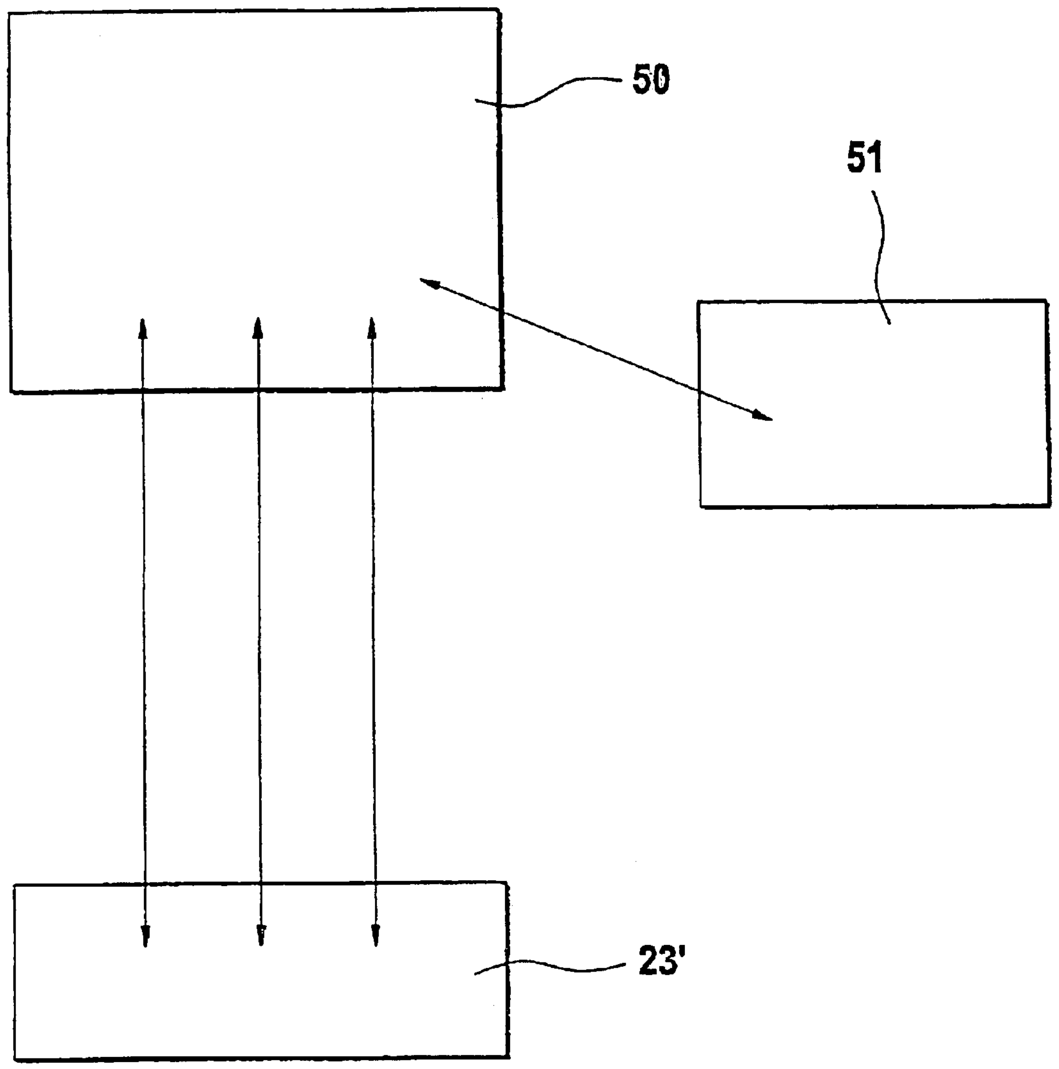
FIG. 5 is a schematic diagram of a measuring and evaluation arrangement.

The components present following separation are sorted into complete components 23 and interrupted components 23'. Interrupted components 23' are brought to a measuring device 50. A schematic measuring and evaluation system is indicated in FIG. 5. The contactless measuring of components 23', which are clamped, for example, on a workpiece support, may be performed using various measuring devices 50. Scanning electron microscopes, profile projectors having vertical illumination, optical cameras, such as CCD cameras or infrared cameras, microscopes having position-sensing systems or microfocus measuring systems having laser scanning (UBM) may be suited for this purpose. The recorded measured values are processed and analyzed, for example, in an evaluation unit 51, the measuring accuracy and quality of the manufactured components 23 being thereby assessed.

What is claimed is:

1. A method for measuring microgalvanically produced components having a three-dimensional, depth-lithographically produced structure comprising:

constructing one of a single- and a multilayer component by galvanic metal deposition, metal deposited around a structure of photoresist defining a desired orifice contour of the component;

incorporating a photoresist region during microgalvanic production which selectively interrupts the structure of the component to be manufactured;

dissolving at least the interrupting photoresist region out of the interrupted component; and contactlessly measuring orifice structure of the interrupted component in a region of a previously existing resist edge of the photoresist region using a measuring device.

2. The method according to claim 1, wherein the photoresist region is incorporated in the incorporating step such that the orifice structure of the component is interrupted in all planes at a same time.

3. The method according to claim 1, wherein angles, cavities, rear spaces and offsets of the orifice structure of the component are measurable in a contactless manner.

4. The method according to claim 1, wherein layer thicknesses of the component are measurable in a contactless manner.

5. The method according to claim 1, wherein the measuring device includes one of a scanning electron microscope, a profile projector having vertical illumination, an optical camera, a CCD camera, an infrared camera, a microscope having a position-sensing system and a microfocus measuring system having laser scanning.

6. The method according to claim 5, further comprising processing and analyzing recorded measured values in an evaluation unit.

7. The method according to claim 1, further comprising the step of producing by galvanic metal deposition one of identical single- and multilayer components, manufactured as complete components without the photoresist regions interrupting the desired orifice structure, together with the components having the interrupting photoresist regions, on one wafer.

8. The method according to claim 7, wherein a ratio of interrupted components to complete components of a same configuration, on one wafer, is 3 to 5:1000.

* * * * *